United States Patent [19]

Potage et al.

[11] Patent Number: 4,864,307
[45] Date of Patent: Sep. 5, 1989

[54] METHOD AND DEVICE FOR THE AUTOMATIC RECOGNITION OF TARGETS FROM "DOPPLER" ECHOES

[75] Inventors: Jean Potage, Franconville; Vincent Albrieux, Paris, both of France

[73] Assignee: LMT Radio Professionnelle, Boulogne Billancourt, France

[21] Appl. No.: 7,671

[22] Filed: Jan. 28, 1987

[30] Foreign Application Priority Data

Jan. 31, 1986 [FR] France ............................ 86 01378

[51] Int. Cl.$^4$ ..................... G01S 13/50; G01S 15/50
[52] U.S. Cl. .................................. 342/192; 367/90
[58] Field of Search ............... 342/192; 381/41, 43, 381/47, 48; 367/90, 94, 116

[56] References Cited

U.S. PATENT DOCUMENTS

| | | | |
|---|---|---|---|
| 3,471,781 | 10/1969 | Shapiro et al. | 342/192 |
| 3,659,051 | 4/1972 | Kalfaion | 381/41 |
| 4,001,820 | 1/1977 | Rosenbaum et al. | 342/192 |
| 4,069,393 | 1/1978 | Martin et al. | 381/43 |
| 4,241,350 | 12/1980 | Uffelman | 342/192 X |
| 4,348,674 | 9/1982 | Muth et al. | 342/192 |
| 4,484,193 | 11/1984 | Bellew | 342/192 X |

FOREIGN PATENT DOCUMENTS 3002148 10/1981 Fed. Rep. of Germany.
2054310 2/1981 United Kingdom.

OTHER PUBLICATIONS

IEEE Transactions on Acoustics, Speech and Signal Processing, vol. ASSP-23, No. 1, Feb. 1975, pp. 67–72, IEEE, N.Y., U.S., F. Itakura: "Minimum Prediction Residual Principle Applied to Speech Recognition", FIGS. 1,2; p. 67, line 2, line 21; p. 69.

ICASSP 83, Proceeedings of the IEEE International Converence on Acoustics, Speech and Signal Processing, Apr. 14–16, 1983, Boston, vol. 1, pp. 93–96, IEEE, N.Y., U.S., S. Imai: "Cepstral Analysis Synthesis on the MEL Frequency Scale".

ICASSP 82, Proceedings of the IEEE International Conference on Acoustics, Speech and Signal Processing, May 3–5, 1982, Paris, vol. 3, pp. 1952–1955, IEEE, N.Y. U.S., G. J. Bosscha et al.: "DFT-Vocoder Using Harmonic-Sieve Pitch Extraction".

Primary Examiner—Thomas H. Tarcza
Assistant Examiner—Gilberto Barroón, Jr.
Attorney, Agent, or Firm—Oblon, Spivak, McClelland, Maier & Neustadt

[57] ABSTRACT

A method and device are provided for the automatic recognition of targets from "Doppler" echoes. The method consists in comparing sequentially the spectra of the "Doppler" signal retransmitted by each target with successions of spectra corresponding to known targets stored in a dictionary memory and indicating the type of target when the spectra of the signal retransmitted by the target have been recognized.

6 Claims, 2 Drawing Sheets

FIG_1
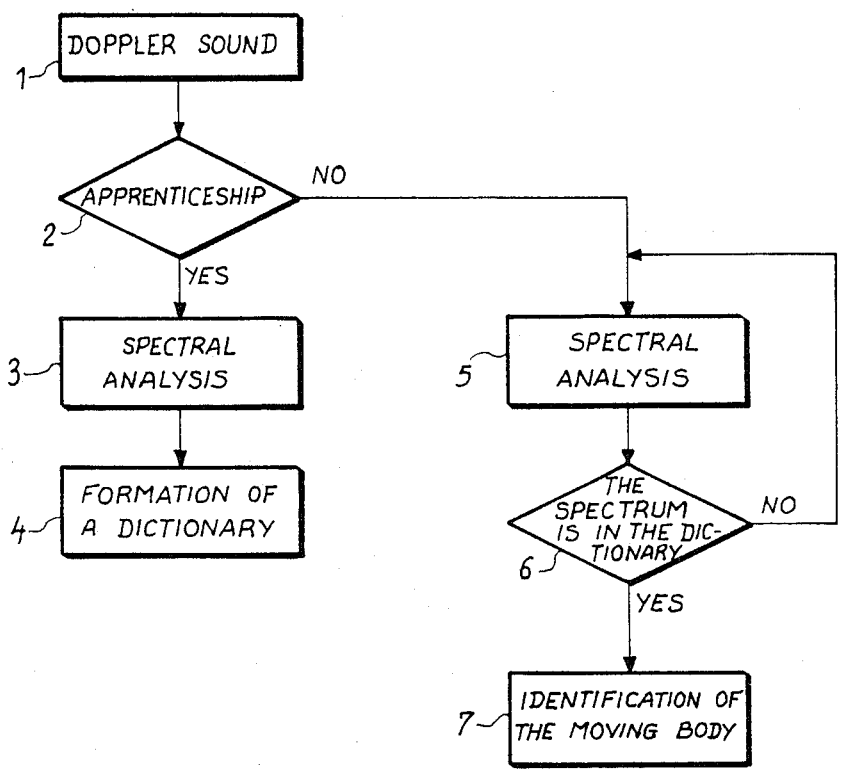

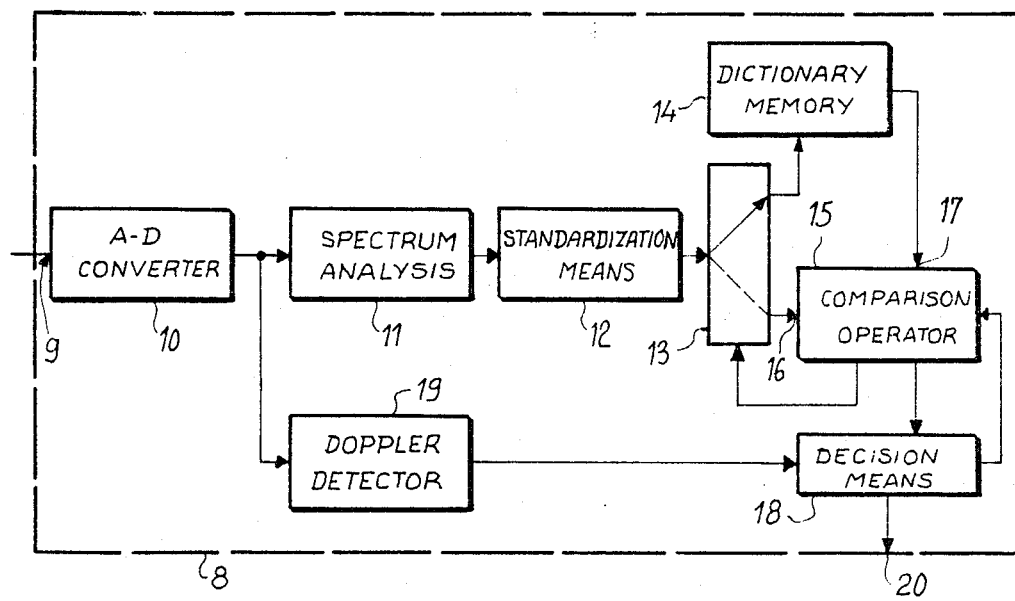
FIG_2
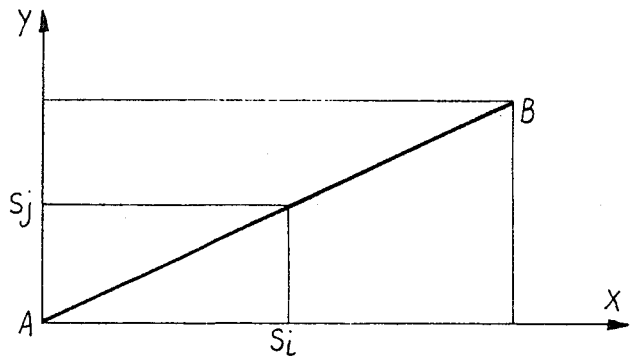
FIG_3
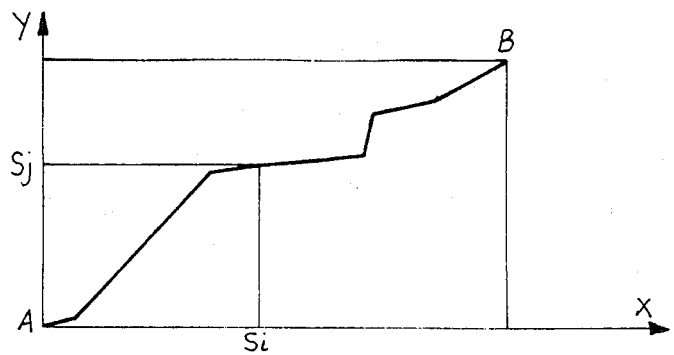
FIG_4

METHOD AND DEVICE FOR THE AUTOMATIC RECOGNITION OF TARGETS FROM "DOPPLER" ECHOES

BACKGROUND OF THE INVENTION

The present invention relates to a method and device for the automatic recognition of targets from "Doppler" echoes.

In radar or sonar installations such recognition is usually performed by a specialized staff formed of operators who listen on loudspeakers or earphones to the 'Doppler' sounds supplied by targets for determining their nature, each operator proceeding by comparison with known sounds already referenced and identified.

Besides the fact that this procedure requires an apprenticeship of each operator, its credibility is not absolute and depends for a great part on the auditory faculties of the operators in particular when the listening conditions are poor and particularly when the "Doppler" signal received is buried in considerable noise.

SUMMARY OF THE INVENTION

The aim of the invention is to overcome the above drawbacks.

For this, the invention provides a method of automatic recognition of targets from "Doppler" echoes, comprising the steps of comparing sequentially parametric representation vectors of the signal retransmitted by each target with successions of vectors corresponding to known targets stored in a dictionary memory and indicating the type of target when the spectra of the signal retransmitted by the target have been recognized.

The invention also relates to a device for implementing this method.

The main advantage of the method and device of the invention is that they are entirely automatic, no longer requiring the training of specialized staff for recognition of the targets. The spectral analysis means used also confer thereon a great immunity to noise and very low sensitivity to the level variations of the detected 'Doppler' signal.

BRIEF DESCRIPTION OF THE DRAWINGS

Other characteristics and advantages of the invention will also be clear from the following description, with reference to the accompanying drawings given solely by way of example which show:

FIG. 1, a flow chart of the different phases of the target recognition method of the invention;

FIG. 2, one example of implementing the method of the invention;

FIG. 3, a first linear standardization example usable for comparing spectra; and FIG. 4, a second example of standardization by dynamic programming.

DETAILED DESCRIPTION OF THE INVENTION

The method of the invention as exemplified by the flowchart of FIG. 1 consists in carrying out a spectral analysis of the "Doppler" signal provided by the target for comparing the spectra obtained with a given number of spectra of "Doppler" sounds characteristics of known targets recorded in a dictionary memory. As shown in steps 1 and 2 of FIG. 1, this method begins by inputting a doppler sound and if it is desired to teach the system the spectra of known targets, entering an apprenticeship phase represented in steps 3 and 4 of FIG. 1.

During step 3, the "Doppler" sounds characteristic of known targets are analyzed and their spectra are stored during step 4 in a dictionary memory.

When the apprenticeship period is finished, the method becomes operational and each 'Doppler' signal is analyzed during steps 5, 6 and 7 shown in FIG. 1 which consist, after carrying out in step 5 the spectral analysis of the unknown signal, in comparing, in step 6, the spectra obtained with the spectra of the known "Doppler" sounds filed in the dictionary memory. If the analyzed spectra are recognized as forming part of the dictionary, the corresponding target is identified in step 7.

A device for implementing this method is shown in FIG. 2 inside a broken line 8. It includes an A-D converter 10, a spectrum analyzer 11, standardization means 12, a multiplexer 13, a dictionary memory 14, a comparison operator 15 with two inputs 16 and 17, a decision means 18 and a "Doppler" detector 19.

The "Doppler" signal which is possibly transposed into the audio frequency range is applied to the input 9 of the A-D converter 10. This signal is sampled at a frequency twice the useful frequency band and the digital samples obtained are applied to the input of the spectrum analyzer 11. These latter are formed, for example, by binary words of 11 bits possibly containing a sign bit. These samples are processed by the spectrum analyzer 11 which effects the spectral analyzer thereof. This technique, which is widely used in speech recognition, consists in calculating the inverse Fourier transform of the logarithm of the spectrum of the sampled signal applied to the input of the analyzer. The advantage is that it allows results to be obtained which are little dependent on the parasite noise affecting the analyzed sound signal and on its level variations. The signals obtained under these conditions at the output of the analyzer 11 are formed by successions of parametric representation vectors of the signals formed of a given number of coefficients calculated during constant time intervals so that all the signals may be described wtih the same number of spectral. These coefficients are then grouped in packets or segments also in accordance with known techniques using time and frequency standardization means 12.

The standardized signals are transmitted through the multiplexer 13 to the dictionary memory 14 or to the comparison operator 15. During the apprenticeship phase, the input of the dictionary memory 14 is connected to the output of the standardization means 12 so that the spectra of known targets may be stored sequentially. This storage takes place in a way known per se under the control of a control member (not shown) formed by a microprocessor or by any equivalent device.

By way of example, by giving to the dictionary memory 14 a capacity of 1600 bytes, the spectra of 20 targets may be recorded, each target being represented by a set of 10 spectra each of 8 coefficients.

When the apprenticeship phase is finished, the multiplexer 13 connects the output of the standardization means 12 directly to the first input 16 of a comparison operator 15 whose second input 17 is connected to the output of the dictionary memory 14.

The comparison operator 15 compares the spectra of the unknown sound with the spectra of known targets contained in the dictionary memory 14.

During this comparison, different time standardization methods may be performed by the standardization means 12. In particular, it is possible to use either linear standardization in the manner of that shown in the diagram of FIG. 3 or else standardization by dynamic programming of the type shown in the diagram of FIG. 4.

In FIG. 3, the indices $S_i$ and $S_j$ of the spectra of the known and unknown sounds are plotted respectively along two orthonormed axes X and Y and the distance separating the sound plotted as X from the sound plotted as Y is measured by summing the distances separating the indices of the elementary spectra $S_i$ and $S_j$.

In FIG. 4, the comparison is no longer made linearly but along a curve connecting together the external indices of the spectra corresponding to points A and B.

In both cases, the recognized form is that whose cumulative or average distance with respect to the form of the spectra of the unknown target is the lowest.

When the forms of the spectra are recognized as belonging to the forms of the dictionary, comparison operator 15 transmits a control signal to the decision means 18 which is coupled to the output of the A-D converter 10 through the "Doppler" detector 19, for checking the probability of the forms recognized with the radial speed of the detected target. Measurement of this speed is provided by the "Doppler" detector 19 which detects the frequency of the "Doppler" spectral line of the analyzed sound which signifies the radial speed of the target. The result of this measurement is transmitted to the decision means 18 which check the coherence between the nature of the target deduced from the forms of the spectra of the detected "Doppler" sound and the radial speed measured.

When the coherence between the forms of the recognized spectra and the radial speed of the target has been found, the decision means 18 transmits to an output 20 a signal indicating the validity of the recognition procedure carried out by the comparison operator 15.

On the other hand, if there is no coherence between the recognized forms of the spectrum and the detected radial speed of a target, this non coherence is also signalled at the output 20 of the decision means by another signal. Possibly, in this case, another analysis of the character of probability may be effected by the decision means 18 which may, for example, propose as recognized target that which arrived in the second position in the recognition procedure. The decision means may further comprise means for reinitializing the comparison of the spectral coefficients when the "Doppler" parameters obtained do not correspond with the identified target.

The example which has just been described of a preferred embodiment of the invention is not limitative. It goes without saying that other embodiments are also possible, which may all result from certain particular choices in the structure of the above-described means for implementing the invention.

It may thus relate more especially to the choice of the spectral analysis means used for recognizing the spectra of the "Doppler" signal, which may as a whole be chosen from similar means existing in speech recognition devices.

In a first approach, instead of using the above-described method of spectral analysis, other types of transforms or other type of analyses may be used similar to those which are used in speech recognition devices for sequentially comparing the short term spectra of the speech signal.

In particular, instead of the above-described spectral transform, a Fourier transform may be used or types of analysis known under the designation LPC (Linear Productive Coding) or else the channel analysis method. Naturally, depending on these choices, the spectra will have to be compared in accordance with an adequate distance measurement dependent on the transform and on the analysis used. For example, if a Euclidien distance measurement is to be used in the previously described spectral analysis, on the other hand a distance measurement will be used in accordance with Itakura's method for the LPC analysis, which is described for example in the article ASSP 2367-72 (1975) entitled "Itakura F. Minimum Prediction Residual Principle Applied to Speech Recognition".

In a second approach, instead of using the above-described methods of comparison, the analytic method may be employed used in the speech recognition technique which consists in comparing speech sounds described by elementary segments such as phonems or diphonems. In these latter case, all the phonems, the lexical characteristics and the syntactical rules of the "Doppler" sounds of the known targets will be stored in the dictionary memory 14, and phonetic, lexical, syntactical and phonetic analyses may be performed by the comparison operator 17 for comparing the analysis results with corresponding data in the dictionary so as to identify the unknown sound from the characteristics of the known sounds stored in the dictionary memory.

Also, the means for detecting the radial speed of the target described above may be advantageously replaced by the means which are usually used for measuring the 'pitch' in speech analysis techniques, in particular all the existing algorithms for making this measurement may be used and particularly the AMDF algorithm which is the abbreviation of Average Magnitude Difference Function, a description of which may be found in the article entitled "Average magnitude difference function pitch detection", IEEE Trans. Acoust. Speech Signal Processing, Vol ASSP 22, No. 5, 1974.

But the spectral analysis means of the radar may also be used directly for giving directly the radial speed of movement of the target.

What is claimed is:

1. A device for automatic recognition of targets movable at different speeds from 'Doppler' sounds supplied by radar or sonar installations comprising:

an A-D converter for converting the Doppler sound into digital signals;

spectral analysis means for calculating, for each target during constant time intervals a predetermined number of spectra, each spectra being represented by a predetermined number of spectral coefficients representative of the inverse Fourier transform of the logarithm of each spectra of the signal represented by the successions of samples supplied by the analog converter;

means for standardizing the spectral coefficients supplied by the spectral analysis means;

means for storing the standardized spectral coefficient during an apprenticeship phase when they correspond to known targets;

a comparison operator for comparing after the apprenticeship phase is finished the spectral coefficients supplied by the standardization means with coefficients of each known target stored in the storage means; and a decision means for identifying the target when the spectral coefficients obtained correspond to those of a target stored in the storage means, and when the speed of the target measured by the radar or the sonar installation corresponds to the nature of the target identified by said spectral coefficients in said storage means.

2. A device according to claim 1, further including a "Doppler" parameter detector for validating the identified target coupled to the decision means.

3. A device according to claim 1, wherein the decision means comprise means for reinitializing the comparison of the spectral coefficients when the "Doppler" parameters obtained do not correspond with the identified target.

4. A device according to claim 1, wherein the comparison operator effects the comparison linearly.

5. A device according to claim 1, wherein the comparison operator effects the comparison by a dynamic programming method.

6. A device according to claim 1, further comprising means for detecting the "Doppler" frequency of the signal retransmitted by the target and for checking the coherence between the nature of the target indicated by comparison of the spectra and the speed indicated by the "Doppler" frequency.

* * * * *